(12) United States Patent
Yang et al.

(10) Patent No.: US 9,198,136 B2
(45) Date of Patent: Nov. 24, 2015

(54) PHYSICAL UPLINK CONTROL CHANNEL POWER CONTROL METHOD AND APPARATUS

(75) Inventors: Weiwei Yang, Shenzhen (CN); Xin Wu, Shenzhen (CN); Bo Dai, Shenzhen (CN); Bin Yu, Shenzhen (CN); Chunli Liang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 148 days.

(21) Appl. No.: 14/008,561

(22) PCT Filed: Jan. 10, 2012

(86) PCT No.: PCT/CN2012/070173
§ 371 (c)(1),
(2), (4) Date: Sep. 29, 2013

(87) PCT Pub. No.: WO2012/136081
PCT Pub. Date: Oct. 11, 2012

(65) Prior Publication Data
US 2014/0029538 A1    Jan. 30, 2014

(30) Foreign Application Priority Data
Apr. 2, 2011    (CN) .......................... 2011 1 0083971

(51) Int. Cl.
*H04W 4/00*    (2009.01)
*H04W 52/04*    (2009.01)
(Continued)

(52) U.S. Cl.
CPC ............ *H04W 52/04* (2013.01); *H04W 52/325* (2013.01); *H04W 52/146* (2013.01); *H04W 52/48* (2013.01); *Y02B 60/50* (2013.01)

(58) Field of Classification Search
None
See application file for complete search history.

(56) References Cited

U.S. PATENT DOCUMENTS 8,553,671 B2 * 10/2013 Kim et al. ..................... 370/344
2008/0200196 A1    8/2008 Muharemovic et al.
(Continued)

FOREIGN PATENT DOCUMENTS

CN    101720122 A    6/2010
CN    101969685 A    2/2011
(Continued)

OTHER PUBLICATIONS

Research in Motion, Large Payload ACK/NACK Bit Mapping for TDD, 3GPP TSG RAN WG1 Meeting #63, R1-106319, Nov. 9, 2010. (6 pages—see entire document).
(Continued)

*Primary Examiner* — Dang Ton
*Assistant Examiner* — Ronald h Davis
(74) *Attorney, Agent, or Firm* — Oppedahl Patent Law Firm LLC; Carl Oppedahl; Micah Gunn

(57) ABSTRACT

The disclosure provides a physical uplink control channel (PUCCH) power control method. A user equipment (UE) determines a power control parameter $n_{HARQ}$ for a PUCCH format 3 transmission and performs power control on the PUCCH format 3 based on the $n_{HARQ}$. The disclosure also provides a PUCCH power control apparatus. According to the disclosure, for a TDD system, the power control parameter $n_{HARQ}$ for the PUCCH format 3 transmission may be determined, which efficiently solves the problem regarding power control when feedback is performed in PUCCH format 3.

13 Claims, 3 Drawing Sheets

301 UE determines power control parameter $n_{HARQ}$ for PUCCH format 3 transmission 302 UE performs power control on the PUCCH format 3 based on the $n_{HARQ}$

(51) Int. Cl.
*H04W 52/32* (2009.01)
*H04W 52/14* (2009.01)
*H04W 52/48* (2009.01)

(56) References Cited

U.S. PATENT DOCUMENTS

| | | | | |
|---|---|---|---|---|
| 2011/0243066 | A1* | 10/2011 | Nayeb Nazar et al. | 370/328 |
| 2012/0082157 | A1* | 4/2012 | Yamada et al. | 370/389 |
| 2012/0113907 | A1* | 5/2012 | Baldemair et al. | 370/329 |
| 2012/0127869 | A1* | 5/2012 | Yin et al. | 370/252 |
| 2012/0236767 | A1 | 9/2012 | Zhu et al. | |

FOREIGN PATENT DOCUMENTS

| | | |
|---|---|---|
| EP | 2498554 A1 | 9/2012 |
| JP | 2010091425 A | 4/2010 |
| JP | 2011041700 A | 3/2011 |
| RU | 2251220 C2 | 4/2005 |
| WO | 2010091425 A2 | 8/2010 |
| WO | 2011041700 A1 | 4/2011 |

OTHER PUBLICATIONS

ZTE: "Power control of PUCCH for LTE-A TDD", 3GPP Draft; R1-110984.ZIP, 3rd Generation Partnership Project (3GPP), Mobile Competence Centre; 650, Route des Lucioles; F-06921 Sophia-Antipolis Cedex; France, vol. RAN WG1, no. Taipei, Taiwan; Feb. 17, 2011. (4 pages—see Supplementary European Search Report in European application No. 12768206.0 for relevant pages).

Supplementary European Search Report in European application No. 12768206.0, mailed on Jun. 30, 2014. (6 pages—see entire document).

International Search Report in international application No. PCT/CN2012/070173, mailed on Mar. 29, 2012. (2 pages—see entire document).

English Translation of the Written Opinion of the International Search Authority in international application No. PCT/CN2012/070173, mailed on Mar. 29, 2012. (7 pages—see entire document).

ZTE; Power control of PUCCH for LTE-A TDD, R1-110984; 3GPP TSG-RAN WG1 #64; Feb. 25, 2011. (4 pages—see International Search Report in international application No. PCT/CN2012/070173 for relevant pages).

* cited by examiner

Fig 4

|  |  | Subframe #n | Subframe #n+1 | Subframe #n+2 | subframe #n+3 |
|---|---|---|---|---|---|
| Cell #0 | CW1 | ▨ | ▨ | ☐ | ▨ |
|  | CW2 | ▨ | ▨ | ☐ | ▨ |
| Cell #1 | CW1 | ▨ | ☐ | ▨ | ▨ |
|  | CW2 | ▨ | ☐ | ▨ | ▨ |
| Cell #2 | CW1 | ☐ | ☐ | ☐ | ☐ |

Fig 5

|  |  | Subframe #n | Subframe #n+1 | Subframe #n+2 | Subframe #n+3 |
|---|---|---|---|---|---|
| Cell #0 | CW1 | ▨ | ▨ | ▨ | SPS |
| Cell #1 | CW1 | ▨ | ☐ | ▨ | ▨ |
|  | CW2 | ▨ | ☐ | ▨ | ▨ |
| Cell #2 | CW1 | ▨ | ▨ | ▨ | ▨ |
|  | CW2 | ▨ | ▨ | ▨ | ▨ |
| Cell #3 | CW1 | ☐ | ☐ | ☐ | ☐ |
|  | CW2 | ☐ | ☐ | ☐ | ☐ |

PHYSICAL UPLINK CONTROL CHANNEL POWER CONTROL METHOD AND APPARATUS

TECHNICAL FIELD

The disclosure relates to power control technology in a mobile communication system, and in particular to a physical uplink control channel (PUCCH) power control method and apparatus.

BACKGROUND

In a 3rd Generation Partnership Project (3GPP) Long Term Evolution (LTE) system, frame structures respectively applicable to a Frequency Division Duplex (FDD) mode and to a Time Division Duplex (TDD) mode are provided. As shown in FIG. 1, in the frame structure applicable to the FDD mode, each radio frame is 10 ms long and consists of 20 slots of length 0.5 ms, numbered from 0 to 19. A subframe i of length 1 ms consists of two consecutive slots 2i and 2i+1, where 0≤i≤9. In the frame structure applicable to the TDD mode, each radio frame of length 10 ms consists of two half-frames of length 5 ms each. Each half-frame consists of five subframes of length 1 ms. Each subframe i is defined as two slots, 2i and 2i+1, of length 0.5 ms in each subframe, where 0≤i≤9.

In the above frame structures, when a Normal Cyclic Prefix (Normal CP) is employed, seven symbols are included in a slot, and when an Extended Cyclic Prefix (Extended CP) is employed, six symbols are included in a slot.

In the LTE system, uplink power control may be performed to control transmit power of uplink physical channels, so as to compensate for channel path loss and shadow fading and suppress inter-cell interference. Uplink physical channels on which power control is performed include Physical Uplink Shared Channel (PUSCH), Physical Uplink Control Channel (PUCCH) and Sounding Reference Signal (SRS). In the LTE system, the uplink power control is performed in a manner of combining open loop control with closed loop control.

In the LTE system, the transmit power (in dBm) of a User Equipment (UE) in a PUCCH of subframe i is defined as equation (1):

$$P_{PUCCH}(i) = \min\{P_{CMAX}, P_{O\_PUCCH} + PL + h(n_{CQI}, n_{HARQ}) + \Delta_{F\_PUCCH}(F) + g(i)\} \quad (1)$$

In equation (1), $P_{CMAX}$ indicates UE Configured Maximum UE Output Power, with a range depending on multiple parameters, including Maximum UE Power depending on UE Power Class, System Configured Maximum Configuration power (IE P-Max), Maximum Configuration Output Power Tolerance (PCMAX Tolerance), Maximum Power Reduction (MPR), and Additional Maximum Power Reduction (A-MPR), etc.

In equation (1), $P_{O\_PUCCH}$ is an open loop power control parameter, which is a sum of a cell specific value $P_{O\_NOMINAL\_PUCCH}$ and a UE specific value $P_{O\_UE\_PUCCH}$.

In equation (1), PL is a Downlink Pathloss Estimate measured and calculated by the UE.

In equation (1), $\Delta_{F\_PUCCH}(F)$ is a power offset associated with PUCCH format (F). In the LTE system, 6 PUCCH formats are defined, i.e., PUCCH format 1/1a/1b/2/2a/2b. $\Delta_{F\_PUCCH}(F)$ is defined by taking PUCCH format 1a as a reference format. The power offset of the reference format, which configured by functionality at a high level, is 0. As shown in table 1,

TABLE 1

| PUCCH format (F) | $\Delta_{F\_PUCCH}(F)$ |
|---|---|
| 1 | [−2, 0, 2] |
| 1b | [1, 3, 5] |
| 2 | [−2, 0, 1, 2] |
| 2a | [−2, 0, 2] |
| 2b | [−2, 0, 2] |

In equation (1), $h(n_{CQI}, n_{HARQ})$ is a value based on the PUCCH format F, where $n_{CQI}$ indicates the number of bits of a Channel Quality Indicator (CQI), $n_{HARQ}$ indicates the number of bits of a Hybrid Automatic Repeat Request (HARQ).

For PUCCH format 1/1a/1b, $h(n_{CQI}, n_{HARQ})=0$.

For PUCCH format 2/2a/2b with normal CP, $$h(n_{CQI}, n_{HARQ}) = \begin{cases} 10 \log_{10}\left(\frac{n_{CQI}}{4}\right) & \text{if } n_{CQI} \geq 4 \\ 0 & \text{otherwise.} \end{cases}$$

For PUCCH format 2 with expended CP, $$h(n_{CQI}, n_{HARQ}) = \begin{cases} 10 \log_{10}\left(\frac{n_{CQI} + n_{HARQ}}{4}\right) & \text{if } n_{CQI} + n_{HARQ} \geq 4 \\ 0 & \text{otherwise.} \end{cases}$$

In equation (1), g(i) indicates a current PUCCH power control adjustment state. As shown in equation (2), $$g(i) = g(i-1) + \sum_{m=0}^{M-1} \delta_{PUCCH}(i - k_m) \quad (2)$$

In equation (2), for the FDD system, M=1, $k_0$=4. That is, for the FDD system, the current PUCCH power control adjustment state g(i) in subframe i is an accumulated value of the power control adjustment state g(i−1) in subframe i−1 and an eNodeB-indicated transmit power control (TPC) command $\delta_{PUCCH}$ in subframe i−4. For the TDD system, the values of M and $k_m$ are related to system uplink-downlink configurations. That is, for the TDD system, the PUCCH power control adjustment state g(i) in subframe i is an accumulated value of the power control adjustment state g(i−1) in subframe i−1 and a sum of a plurality of eNodeB-indicated transmit power control (TPC) commands $\delta_{PUCCH}$ in subframes i−$k_0$, i−$k_1$, . . . , i−$k_{M-1}$. For the TDD system, if subframe i is not an uplink subframe, g(i)=g(i−1).

In equation (2), the transmit power control command $\delta_{PUCCH}$ is a UE specific closed loop modified value, which is transmitted by the eNodeB to a target UE in a Physical Downlink Control Channel (PDCCH). If the UE does not detect a TPC command in a subframe, $\delta_{PUCCH}$=0 dB.

The PUCCH is used to bear uplink control information (UCI), including scheduling request (SR), positive acknowledgement/negative acknowledgement (ACK/NACK) of physical downlink shared channel (PDSCH) and downlink channel state information (CSI) feedback by the UE. There are three forms of CSI, channel quality indication (CQI), pre-coding matrix indicator (PMI) and rank indication (RI).

A LTE-Advanced system is a next generation evolution system of the LTE system. In order to support greater system bandwidth and become backward compatible with the current LTE standard, a carrier aggregation technology is introduced.

FIG. 2 is a schematic view showing the implementation of carrier aggregation in the LTE-A system. As shown in FIG. 2, each aggregated carrier is referred to as a component carrier (CC) or a serving cell. The plurality of CCs may be continuous or discontinuous. In FIG. 2, for discontinuous CCs, there is a component carrier gap between the CCs, each CC may be in a same operating band or different operating bands, and may include a plurality of sub-carriers.

In order to transmit large load ACK/NACK response information, a new PUCCH format is introduced in the LTE-A system, which is referred to as PUCCH format 3. As specified in the prior art, in a FDD system, the ACK/NACK response information to be feedback includes 10 bits at most, and in a TDD system, the ACK/NACK response information to be feedback includes 20 bits at most. When the ACK/NACK response information to be feedback has more than 20 bits, a spatial bundling operation is performed on all ACK/NACK response information corresponding to PDSCHs including 2 codeword streams. That is, a logical AND operation is performed on the corresponding ACK/NACK response information. When the PUCCH format 3 transmission is employed, in the case that the number of feedback bits is less than or equal to 11, a Reed-Muller (RM) encoding scheme is employed; when the number of feedback bits is greater than 11, a dual RM encoding scheme is employed, the ACK/NACK response information to be feedback is divided into two parts, which are encoded by using the RM encoding scheme respectively and then cascaded-interleaved for transmission. However, regarding how to divide the ACK/NACK response information, no specific solution has been proposed in the prior art.

As specified in the prior art, in the LTE-A system, the UE may concurrently receive a plurality of PDSCHs in multiple configured or activated serving cells. The ACK/NACK response information of the plurality of PDSCHs is transmitted in a single PUCCH on a UE specific CC. The UE specific CC is referred to as primary component carrier (PCC), or Primary cell (Pcell).

For the LTE-A system, the PUCCH power control is performed according to equation (3). The transmit power of PUCCH format 3 in subframe i is represented by $P_{PUCCH}(i)$, $$P_{PUCCH}(i) = \min\{P_{CMAX,c}(i), P_{0\_PUCCH} + PL_c + h(n_{CQI}, n_{HARQ}, n_{SR}) + \Delta_{F\_PUCCH}(F) + \Delta_{TxD}(F') + g(i)\} \quad (3)$$

where $P_{CMAX,c}(i)$ indicates the maximum transmit power of the serving cell c in subframe i, $P_{0\_PUCCH}$ indicates an open loop power control parameter, $\Delta_{F\_PUCCH}(F)$ indicates a power offset associated with PUCCH format F, $PL_c$ indicates a downlink path loss estimate of the serving cell c measured and calculated by the UE, $\Delta_{TxD}(F')$ indicates a transmission diversity power compensation set according to a different PUCCH format F, with a value in a set of $\{0, -1, -2, -3\}$ dB but not limited to this data set, $h(n_{CQI}, n_{HARQ}, n_{SR})$ is a value based on the PUCCH format; as specified in the prior art, if single RM encoded PUCCH format 3 is employed and no transmission diversity is configured, $$h(n_{CQI}, n_{HARQ}, n_{SR}) = \frac{n_{HARQ} + n_{SR} - 1}{2},$$

if the single RM encoded PUCCH format 3 is employed and transmission diversity is configured, or if dual RM encoded PUCCH format 3 is employed, $$h(n_{CQI}, n_{HARQ}, n_{SR}) = \frac{n_{HARQ} + n_{SR} - 1}{3},$$

where $n_{SR}=1$ if the current subframe is configured as an SR transmission subframe, otherwise, $n_{SR}=0$, and $n_{CQI}$ is the number of bits of the channel quality indicator.

For the FDD system, $n_{HARQ}$ indicates the number of received transmission blocks. However, for the TDD system, a method for determining the $n_{HARQ}$ has not ever been proposed in the prior art, and thus there is no way to perform PUCCH format 3 power control according to equation (3).

SUMMARY

In view of the above, a PUCCH power control method and apparatus are provided, which efficiently solve the problem regarding power control when PUCCH format 3 transmission is employed.

For the above purpose, the technical solutions of the disclosure are provided as follows.

The disclosure provides a PUCCH power control method, in which the UE determines a power control parameter $n_{HARQ}$ for the PUCCH format 3 transmission and performs power control on the PUCCH format 3 based on the $n_{HARQ}$.

In the above method, the determining of the power control parameter $n_{HARQ}$ for the PUCCH format 3 transmission may include: when a spatial bundling operation is employed, determining the $n_{HARQ}$ as a sum of a number of UE-received physical downlink shared channels (PDSCHs) with corresponding PDCCHs, a number of semi-persistent scheduling (SPS) subframes and a number of downlink control information (DCI) indicating SPS release In the above method, the determining of the power control parameter $n_{HARQ}$ for the PUCCH format 3 transmission may include: when the spatial bundling operation is not employed, determining the $n_{HARQ}$ as a sum of a number of UE-received transmission blocks, a number of transmission blocks for which PDCCH drop occurs, and a number of DCI indicating SPS release.

In the above method, the number of UE-received PDSCHs with corresponding PDCCHs may be equal to a total number of UE-received PDSCHs with corresponding PDCCHs in all configured serving cells, wherein when the UE does not detect a downlink assignment index (DL DAI) in downlink grant information in a downlink window of a serving cell, the UE determines the number of UE-received PDSCHs with corresponding PDCCHs received in the serving cell as 0; when the UE detects the DL DAI in the downlink window of the serving cell, the UE determines the number of UE-received PDSCHs with corresponding PDCCHs in the serving cell as the number of PDSCHs corresponding to a value of a last DL DAI detected in the downlink window, wherein the downlink window of the serving cell consists of downlink subframes of the serving cell assigned for the UE.

In the above method, the number of transmission blocks for which PDCCH drop occurs is equal to a total number of transmission blocks for which PDCCH drop occurs in all serving cells configured for the UE, wherein when the UE does not detect a DL DAI in the downlink window of the serving cell, the number of transmission blocks for which PDCCH drop occurs in the serving cell is determined as 0; when the UE detects the DL DAI in the downlink window of the serving cell, the number of transmission blocks for which PDCCH drop occurs in the serving cell is equal to the number of PDSCHs corresponding to a value of a last DL DAI detected by the UE in the downlink window minus the number of UE-received PDSCHs with corresponding PDCCHs in the downlink window, and multiplied with the number of transmission blocks corresponding to a transmission mode configured by the serving cell, and wherein the downlink window of the serving cell consists of downlink subframes of the serving cell assigned for the UE.

In the above method, the determining of the power control parameter $n_{HARQ}$ for the PUCCH format 3 transmission may include: when a spatial bundling operation is employed, determining the $n_{HARQ}$ as a sum of a number of UE-received PDSCHs with corresponding PDCCHs, and a number of DCI indicating SPS release.

In the above method, the determining of the power control parameter $n_{HARQ}$ for the PUCCH format 3 transmission may include: when a spatial bundling operation is employed, determining the $n_{HARQ}$ as a sum of a number of UE-received transmission blocks and a number of DCI indicating SPS release.

In the above method, the performing of power control on the PUCCH format 3 based on the $n_{HARQ}$ may include: when PUCCH format 3 transmission is employed in subframe (i) of serving cell c, putting the $n_{HARQ}$ into equation (3) to result in a power $P_{PUCCH}(i)$ of subframe i transmitted in PUCCH format 3, $$P_{PUCCH}(i) = \min\{P_{CMAX,c}(i), P_{O\_PUCCH} + PL_c + h(n_{CQI}, n_{HARQ}, n_{SR}) + \Delta_{F\_PUCCH}(F) + \Delta_{TxD}(F) + g(i)\}$$

where $P_{CMAX,c}(i)$ is a maximum transmit power of the serving cell c in subframe i, $P_{O\_PUCCH}$ is an open loop parameter, $\Delta_{F\_PUCCH}(F)$ is a power offset associated with PUCCH format F, $PL_c$ is a downlink path loss of the serving cell c measured and calculated by the UE, $\Delta_{TxD}(F')$ is a transmission diversity power offset set according to a different PUCCH format F', $h(n_{CQI}, n_{HARQ}, n_{SR})$ is a value based on the PUCCH format, if single RM encoded PUCCH format 3 is employed and no transmission diversity is configured, $$h(n_{CQI}, N_{HARQ}, n_{SR}) = \frac{n_{HARQ} + n_{SR} - 1}{2};$$

if single RM encoded PUCCH format 3 is employed and transmission diversity is configured, or if dual RM encoded PUCCH format 3 is employed, $$h(n_{CQI}, n_{HARQ}, n_{SR}) = \frac{n_{HARQ} + n_{SR} - 1}{3},$$

if a current subframe is configured as an SR transmission subframe, $n_{SR}=1$; otherwise, $n_{SR}=0$; $n_{CQI}$ is a number of bits of a channel quality indicator.

In the above method, when the dual RM encoding scheme is used for PUCCH format 3 transmission, the ACK/NACK response information to be transmitted may be mapped to two ACK/NACK response information bit sequences according to a predefined rule, each ACK/NACK response information bit sequence may be encoded using the RM encoding scheme, and then the two encoded ACK/NACK response information bit sequences may be interleaved for transmission.

In the above method, the mapping of the ACK/NACK response information to be transmitted to two ACK/NACK response information bit sequences according to a predefined rule may include: determining, by the UE, ACK/NACK response information to be feedback, obtaining, by the UE, an ACK/NACK response information sequence corresponding to the ACK/NACK response information in an ascending order of serving cell indexes, for a same serving cell, mapping, by the UE, the ACK/NACK response information to the ACK/NACK response information sequence according to values of DL DAI in the downlink grant information, wherein ACK/NACK response information of DCI indicating SPS release is located at the end of the ACK/NACK response information feedback for the serving cell, then mapping, by the UE, the ACK/NACK response information in the ACK/NACK response information sequence to two ACK/NACK response information sequences according to their respective even and odd positions.

In the above method, for a same serving cell, the mapping of the ACK/NACK response information to the ACK/NACK response information sequence according to the values of DL DAI in the downlink grant information may include: when the spatial bundling operation is performed, the UE maps the spatial-bundled ACK/NACK response information to the ACK/NACK response information sequence according to the values of DL DAI in the downlink grant information; when the spatial bundling operation is not performed, the UE maps the ACK/NACK response information of two transmission blocks corresponding to each PDSCH to the ACK/NACK response information sequence according to the values of DL DAI in the downlink grant information, where the ACK/NACK response information of the first transmission block is firstly mapped and then the ACK/NACK response information of the second transmission block is mapped; or where the ACK/NACK response information of the first transmission block is firstly mapped and then the ACK/NACK response information of the second transmission block is mapped; or when the spatial bundling operation is not performed, the UE may map the ACK/NACK response information of two codeword streams corresponding to each PDSCH to the ACK/NACK response information sequence according to the values of DL DAI in the downlink grant information. When the DL DAI is an odd number, the ACK/NACK response information of the first codeword stream is firstly mapped and then the ACK/NACK response information of the second codeword stream is mapped; when the DL DAI is an even number, the ACK/NACK response information of the second codeword stream is firstly mapped and then the ACK/NACK response information of the first codeword stream is mapped. or, when the DL DAI is an even number, the ACK/NACK response information of the first codeword stream is firstly mapped and then the ACK/NACK response information of the second codeword stream is mapped; when the DL DAI is an odd number, the ACK/NACK response information of the second codeword stream is firstly mapped and then the ACK/NACK response information of the first codeword stream is mapped.

In the above method, the first transmission block is a transmission block of which a transmission block index is 0, and the second transmission block is a transmission block of which a transmission block index is 1, or the first codeword stream is a codeword stream of which a codeword stream index is 0 and the second codeword stream is a codeword stream of which a codeword stream index is 1.

The disclosure also provides a PUCCH power control device, which includes a determination module and a power control module.

The determination module is configured to determine a power control parameter $n_{HARQ}$ for PUCCH format 3 transmission and to transmit the $n_{HARQ}$ to the power control module.

The power control module is configured to perform power control on the PUCCH format 3 transmission based on the $n_{HARQ}$.

In the PUCCH power control method and apparatus provided by the disclosure, the UE determines a power control parameter $n_{HARQ}$ for the PUCCH format 3 transmission and performs power control on the PUCCH format 3 based on the $n_{HARQ}$. In this way, for a TDD system, a power control parameter $n_{HARQ}$ for PUCCH format 3 transmission may be determined, which efficiently addresses the problem regarding power control when feedback is performed in PUCCH format 3. Additionally, in the disclosure, the PUCCH format 3 transmission is performed using the Dual RM encoding scheme, which implements transmission of response information in PUCCHs.

BRIEF DESCRIPTION OF THE DRAWINGS

FIG. 4 is a schematic view showing a correspondence between a serving cell configured in a TDD system and a downlink subframe according to a first embodiment of the disclosure; and FIG. 5 is a schematic view showing a correspondence between a serving cell configured in a TDD system and a downlink subframe according to a second embodiment of the disclosure.

DETAILED DESCRIPTION

In an embodiment of the disclosure, generally, a UE determines a power control parameter $n_{HARQ}$ for a PUCCH format 3 transmission, and performs power control on the PUCCH 3 transmission based on the $n_{HARQ}$.

Hereinafter, the disclosure is described in detail with reference to the drawings and the specific embodiments.

Figure 1:
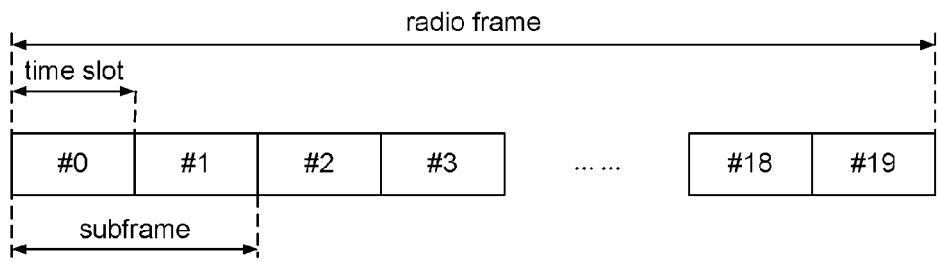
FIG. 1 is a schematic view of a frame structure in an existing FDD system.
Figure 2:
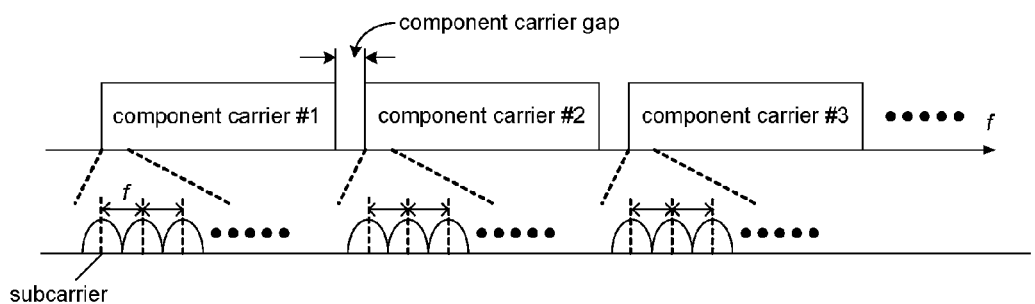
FIG. 2 is a schematic view of carrier aggregation in the prior art.
Figure 3:
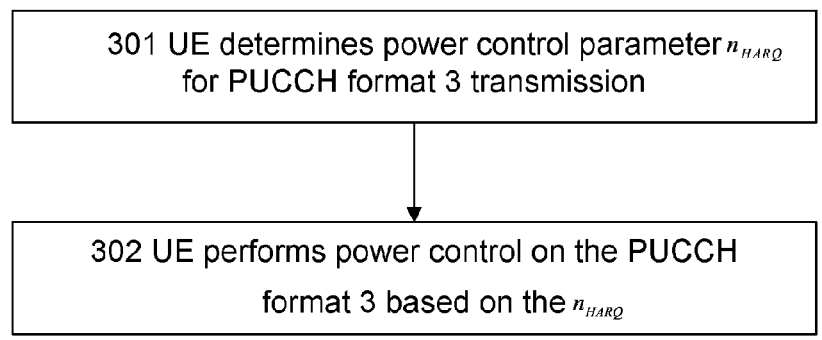
FIG. 3 is a flow chart for implementing a PUCCH power control method according to the disclosure.

The disclosure provides a PUCCH power control method. As shown in FIG. 3, the method includes the following steps:

Step 301: the UE determines a power control parameter $n_{HARQ}$ for a PUCCH format 3 transmission.

Specifically, when a spatial bundling operation is performed, $n_{HARQ}$ is a sum of the number of PDSCHs which are received by the UE and for which there are corresponding PDCCHs, the number of SPS subframes and the number of DCI indicating SPS release. As shown in equation (4), $$n_{HARQ} = \sum_{i=0}^{n-1} (N_{i,PDSCH}^{received}) + N_{SPS} + N_{SPS,Release}, \qquad (4)$$

where n indicates the number of configured serving cells; $N_{i,PDSCH}^{received}$ indicates the number of PDSCHs which are received by the UE in the primary serving cell i and for which there are corresponding PDCCHs, i=0, 1, . . . , n−1; $N_{SPS}$ indicates the number of SPS subframes received by the UE in the primary serving cell, the value of the $N_{SPS}$ is 0 or 1; $N_{SPS,Release}$ indicates the number of DCI indicating SPS release received by the UE in the primary serving cell, the value of the $N_{SPS,Release}$ is 0 or 1.

Here, the number of PDSCHs which are received by the UE and for which there are corresponding PDCCHs is generally equal to the total number of PDSCHs received by the UE in all configured serving cells for which there are corresponding PDCCHs. When the UE does not detect a downlink assignment index (DL DAI) in a downlink window of the serving cell i, $N_{i,PDSCH}^{received}=0$ when the UE detects DL DAI(s) in a downlink window of the serving cell i, $N_{i,PDSCH}^{received}=V_{i,DAI}^{DL}$. $V_{i,DAI}^{DL}$ indicates the number of PDSCHs corresponding to the value of the last DL DAI detected in the downlink window of the serving cell i. The downlink window of the serving cell i consists of downlink subframes of the serving cell i assigned for the UE.

When the spatial bundling operation is not employed, $n_{HARQ}$ is equal to a sum of the number of UE-received transmission blocks, the number of transmission blocks for which PDCCH drop occurs, and the number of DCI indicating SPS release, as shown in equation (5), $$n_{HARQ} = \sum_{i=0}^{n-1} (N_{i,TB}^{received} + N_{i,missed}) + N_{SPS,Release}; \qquad (5)$$

where n indicates the number of configured serving cells; $N_{i,TB}^{received}$ indicates the number of UE-received transmission blocks in the serving cell i; $N_{i,missed}$ indicates the number of the UE's transmission blocks for which PDCCH drop occurs in the serving cell i, i=0, 1, . . . , n−1; $N_{SPS,Release}$ indicates the number of DCI indicating SPS release received by the UE in the primary serving cell, the value of the $N_{SPS,Release}$ is 0 or 1.

Here, the number of transmission blocks for which PDCCH drop occurs is generally equal to the total number of transmission blocks for which PDCCH drop occurs in all serving cells configured for the UE. When the UE does not detect a DL DAI of downlink grant information in a downlink window of the serving cell i, $N_{i,missed}=0$; when the UE detects DL DAI(s) in a downlink window of the serving cell i, $N_{i,missed}=(V_{i,DAI}^{DL}-U_{i,DAI})\cdot C_i$. $U_{i,DAI}$ indicates the number of PDSCHs received by the UE in downlink window of the cell i for which there are corresponding PDCCHs; $V_{i,DAI}^{DL}$ indicates the number of PDSCHs corresponding to the value of the last DL DAI detected in the downlink window of the serving cell i. $C_i$ indicates the number of transmission blocks corresponding to a transmission mode configured by the serving cell i, the value of the $C_i$ is 1 or 2. The downlink window of the serving cell i consists of downlink subframes of the serving cell i configured for the UE.

In this step, the determining of a power control parameter $n_{HARQ}$ for a PUCCH format 3 transmission may also include: when a spatial bundling operation is employed, $n_{HARQ}$ is a sum of the number of PDSCHs received by the UE for which there are corresponding PDCCHs, the number of SPS subframes and the number of DCI indicating SPS release. As shown in equation (4), $$n_{HARQ} = \sum_{i=0}^{n-1} (N_{i,PDSCH}^{received}) + N_{SPS,Release}, \qquad (6)$$

where n indicates the number of configured serving cells; $N_{i,PDSCH}^{received}$ indicates the number of PDSCHs received by the UE in the primary serving cell i for which there are corresponding PDCCHs, i=0, 1, . . . , n−1; $N_{SPS,Release}$ indicates the number of DCI indicating SPS release received by the UE in the primary serving cell, the value of the $N_{SPS,Release}$ is 0 or 1.

When a spatial bundling operation is employed, $n_{HARQ}$ is a sum of the number of UE-received transmission blocks and the number of DCI indicating SPS release. As shown in equation (7), $$n_{HARQ} = \sum_{i=0}^{n-1} (N_{i,TB}^{received}) + N_{SPS,Release}, \quad (7)$$

where n indicates the number of configured serving cells; $N_{i,TB}^{received}$ indicates the number of UE-received transmission blocks in the serving cell i; $N_{SPS,Release}$ indicates the number of DCI indicating SPS release received by the UE in the primary serving cell, the value of the $N_{SPS,Release}$ is 0 or 1.

Step 302: UE performs power control on the PUCCH format 3 based on the $n_{HARQ}$.

Specifically, the UE puts the $n_{HARQ}$ into equation (3) and performs power control on the PUCCH format 3 according to equation (3). For example, when PUCCH format 3 transmission is employed in subframe i of the serving cell c, the power $P_{PUCCH}(i)$ of subframe i transmitting PUCCH format 3 is resulted by putting the $n_{HARQ}$ into equation (3).

Further, in the above method, when ACK/NACK response information is transmitted in PUCCH format 3 using a dual RM encoding scheme, the ACK/NACK response information to be transmitted is mapped to two ACK/NACK response information bit sequences according to a predefined rule, each ACK/NACK response information bit sequence is encoded using the RM encoding scheme, and the two encoded ACK/NACK response information bit sequences are cascaded-interleaved for transmission.

The mapping of the ACK/NACK response information to be transmitted to two ACK/NACK response information bit sequences according to a predefined rule may be performed in the following way: the UE determines the ACK/NACK response information based on the number of configured serving cells, the transmission mode configured by each serving cell and the ratio of uplink subframes to downlink subframes, obtains an ACK/NACK response information sequence corresponding to the ACK/NACK response information in an ascending order of serving cell indexes, maps the ACK/NACK response information for a same serving cell to the ACK/NACK response information sequence according to the values of DL DAI in the downlink grant information, with the ACK/NACK response information of DCI indicating the SPS release located at the end of the ACK/NACK response information feedback for the serving cell, and then maps the ACK/NACK response information in the ACK/NACK response information sequence to two ACK/NACK response information sequences according to their respective even and odd positions. For example, the UE maps the ACK/NACK response information in the ACK/NACK response information sequence that is in the odd positions to the first ACK/NACK response information sequence and maps the ACK/NACK response information in the ACK/NACK response information sequence that is in the even positions to the second ACK/NACK response information sequence; or the UE maps the ACK/NACK response information in the ACK/NACK response information sequence that is in the even positions to the first ACK/NACK response information sequence and maps the ACK/NACK response information in the ACK/NACK response information sequence that is in the odd positions to the second ACK/NACK response information sequence.

Generally, the UE maps the ACK/NACK response information for a same serving cell to the ACK/NACK response information sequence according to the values of DL DAI in the downlink grant information in the following way: when the spatial bundling operation is employed, the UE maps the spatial-bundled ACK/NACK response information to the ACK/NACK response information sequence according to the values of DL DAI in the downlink grant information; when the spatial bundling operation is not employed, the UE maps the ACK/NACK response information of two transmission blocks corresponding to each PDSCH to the ACK/NACK response information sequence according to the values of DL DAI in the downlink grant information, where the ACK/NACK response information of the first transmission block is firstly mapped and then the ACK/NACK response information of the second transmission block is mapped; or the ACK/NACK response information of the second transmission block is firstly mapped and then the ACK/NACK response information of the first transmission block is mapped. The first transmission block is a transmission block of which a transmission block index is 0, and the second transmission block is a transmission block of which a transmission block index is 1.

Alternatively, when the spatial bundling operation is not employed, the UE maps the ACK/NACK response information of two codeword streams corresponding to each PDSCH to the ACK/NACK response information sequence according to the values of DL DAI in the downlink grant information in the following way: when the DL DAI is an odd number, the ACK/NACK response information of the first codeword stream is firstly mapped and then the ACK/NACK response information of the second codeword stream is mapped; when the DL DAI is an even number, the ACK/NACK response information of the second codeword stream is firstly mapped and then the ACK/NACK response information of the first codeword stream is mapped; or when the DL DAI is an even number, the ACK/NACK response information of the first codeword stream is firstly mapped and then the ACK/NACK response information of the second codeword stream is mapped; when the DL DAI is an odd number, the ACK/NACK response information of the second codeword stream is firstly mapped and then the ACK/NACK response information of the first codeword stream is mapped. The first codeword stream is a codeword stream of which a codeword stream index is 0 and the second codeword stream is a codeword stream of which a codeword stream index is 1.

For implementing the above method, the disclosure provides a PUCCH power control device, which includes a determination module and a power control module.

The determination module is configured to determine a power control parameter $n_{HARQ}$ for a PUCCH format 3 transmission and to transmit the $n_{HARQ}$ to the power control module.

The power control module is configured to perform power control on the PUCCH format 3 transmission based on the $n_{HARQ}$.

Specifically, the determination module determines the power control parameter $n_{HARQ}$ for the PUCCH format 3 transmission according to equation (4) or (6) when a spatial bundling operation is employed, and determines the power control parameter $n_{HARQ}$ for PUCCH format 3 transmission according to equation (5) or (7) when the spatial bundling operation is not employed.

Specifically, the power control module puts the $n_{HARQ}$ into equation (3) and performs power control on the PUCCH format 3 transmission according to equation (3).

Additionally, the UE may also include a dual RM transmission module which is configured to perform the PUCCH format 3 transmission using a dual RM encoding scheme.

Specifically, when ACK/NACK response information is to be transmitted, the dual RM transmission module maps the ACK/NACK response information to be transmitted to two ACK/NACK response information bit sequences according to a predefined rule, encodes each ACK/NACK response information bit sequence using the RM encoding scheme, and cascaded-interleaves the two encoded ACK/NACK response information bit sequences for transmission.

The mapping of the ACK/NACK response information to be transmitted to two ACK/NACK response information bit sequences according to a predefined rule may be performed by the dual RM transmission module in the following way: the dual RM transmission module determines the ACK/NACK response information based on the number of configured serving cells, the transmission mode configured by each serving cell and the ratio of uplink subframes to downlink subframes, obtains an ACK/NACK response information sequence corresponding to the ACK/NACK response information in an ascending order of serving cell indexes, maps the ACK/NACK response information for a same serving cell to the ACK/NACK response information sequence according to the values of DL DAI in the downlink grant information, with the ACK/NACK response information of SPS release located at the end of the ACK/NACK response information feedback for the serving cell, and then the dual RM transmission module maps the ACK/NACK response information in the ACK/NACK response information sequence to two ACK/NACK response information sequences according to their respective even and odd positions.

Implementation process and principle of the method of the disclosure will be described in detail in connection with the specific embodiments.

Embodiment 1

In the embodiment, as shown in FIG. 4, in the TDD system, the eNodeB configures the UE to transmit ACK/NACK response information in PUCCH format 3, and configures three serving cells for the UE, Cell#0, Cell#1 and Cell#2. Except for Cell#2 which needs feedback of ACK/NACK response information of 1 bit, the other 2 serving cells need feedback of ACK/NACK response information of 2 bits. In the embodiment, assuming that ACK/NACK response information of 4 downlink subframes, i.e., downlink subframes #n, #n+1, #n+2 and #n+3 have to be feedback in a certain uplink subframe. That is, the downlink window consists of downlink subframes #n, #n+1, #n+2 and #n+3. In Cell#0, the UE detects that DL DAI=0 in downlink subframe #n, DL DAI=1 in downlink subframe #n+1, and DL DAI=3 in downlink subframe #n+3. In Cell#1, the UE detects that DL DAI=0 in downlink subframe #n, DL DAI=2 in downlink subframe #n+2, and DL DAI=3 in downlink subframe #n+3. There is no DCI format indicating the SPS release or SPS transmission subframe in the serving cells. Since the ACK/NACK response information to be transmitted includes only 20 bits, there is no need to perform the spatial bundling operation. Here, the slash block in FIG. 4 indicates transmission blocks received by the UE and the blank block indicates the transmission blocks not received by the UE.

In Cell#0, UE detects PDCCHs which have corresponding PDCCHs in subframes #n, #n+1 and #n+3, the UE receives 6 transmission blocks and detects that DL DAI=3 in the last subframe #n+3.

In Cell#1, UE detects PDSCHs which have corresponding PDCCHs in subframes #n, #n+2 and #n+3, the UE receives 6 transmission blocks and detects that DL DAI=3 in the last subframe #n+3.

In Cell#2, the UE does not receive the transmission block, the UE does not detect the PDCCH, and the UE determines the number of PDSCHs corresponding to the value $V_{i,DAI}^{DL}$ according to table 2.

TABLE 2

| DAI high bit, low bit | the value of DAI | the number of PDSCH transmitted |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

In the embodiment, one of the following approaches is used to determine the power control parameter $n_{HARQ}$ for the PUCCH format 3 transmission.

I: the UE determines the power control parameter $n_{HARQ}$ for the PUCCH format 3 transmission according to equation (5).

Specially, if the UE receives 6 transmission blocks in Cell#0, $N_{0,TB}^{received}=6$, $N_{0,missed}=(4-3)*2=2$; if the UE receives 6 transmission blocks in Cell#1, $N_{1,TB}^{received}=6$, $N_{1,missed}=(4-3)*2=2$; if the UE does not receive a transmission block in Cell#2, and does not detect a DL DAI, $N_{2,TB}^{received}=0$, $N_{2,missed}=0$; $N_{0,TB}^{received}$, $N_{0,missed}$, $N_{1,TB}^{received}$, $N_{1,missed}$, $N_{2,TB}^{received}$, $N_{2,missed}$ and $N_{SPS,Release}=0$ are put into equation (5) to result in $n_{HARQ}=16$.

II: the UE determines the power control parameter $n_{HARQ}$ for the PUCCH format 3 transmission according to equation (7) to result in $n_{HARQ}=12$.

In the embodiment, the transmission of ACK/NACK response information in PUCCH format 3 is implemented in the following way.

The UE obtains an ACK/NACK response information sequence corresponding to the ACK/NACK response information in an order of Cell#0, Cell#1, Cell#2, maps the ACK/NACK response information for a same serving cell to the ACK/NACK response information sequence according to the values of DL DAI, then maps the ACK/NACK response information in the ACK/NACK response information sequence to two ACK/NACK response information sequences according to their respective even and odd positions, encodes each ACK/NACK response information bit sequence using the RM encoding scheme, and cascaded-interleaves the two encoded ACK/NACK response information bit sequences for transmission.

The mapping of the ACK/NACK response information for a same serving cell to the ACK/NACK response information sequence according to the values of DL DAI may be performed in one of the following ways.

I: the UE maps the ACK/NACK response information of two transmission blocks corresponding to each PDSCH to the ACK/NACK response information sequence according to the values of DL DAI in the downlink grant information, where the ACK/NACK response information of the first transmission block is firstly mapped and then the ACK/NACK response information of the second transmission block is mapped, or the ACK/NACK response information of the second transmission block is firstly mapped and then the ACK/NACK response information of the first transmission block is mapped. The first transmission block is a transmission block of which a transmission block index is 0, and the second transmission block is a transmission block of which a transmission block index is 1.

II: the UE maps the ACK/NACK response information of two codeword streams corresponding to each PDSCH to the ACK/NACK response information sequence according to the values of DL DAI in the downlink grant information, when the DL DAI is an odd number, the ACK/NACK response information of the first codeword stream is firstly mapped and then the ACK/NACK response information of the second codeword stream is mapped, and when the DL DAI is an even number, the ACK/NACK response information of the second codeword stream is firstly mapped and then the ACK/NACK response information of the first codeword stream is mapped; or, when the DL DAI is an even number, the ACK/NACK response information of the first codeword stream is firstly mapped and then the ACK/NACK response information of the second codeword stream is mapped, and when the DL DAI is an even number, the ACK/NACK response information of the second codeword stream is firstly mapped and then the ACK/NACK response information of the first codeword stream is mapped. The first codeword stream is a codeword stream of which a codeword stream index is 0 and the second codeword stream is a codeword stream of which a codeword stream index is 1.

The mapping of the ACK/NACK response information in the ACK/NACK response information sequence to two ACK/NACK response information sequences according to their respective even and odd positions may be performed in the following way: mapping the ACK/NACK response information in the ACK/NACK response information sequence that is in the odd positions to the first ACK/NACK response information sequence and mapping the ACK/NACK response information in the ACK/NACK response information sequence that is in the even positions to the second ACK/NACK response information sequence; or mapping the ACK/NACK response information that is in the even positions to the first ACK/NACK response information sequence and mapping the ACK/NACK response information in the ACK/NACK response information sequence that is in the odd positions to the second ACK/NACK response information sequence.

Embodiment 2

In the embodiment, as shown in FIG. 5, in the TDD system, the eNodeB configures the UE to transmit ACK/NACK response information in PUCCH format 3, and configures four serving cells for the UE, Cell#0, Cell#1, Cell#2 and Cell#3. Except for Cell#1 which needs feedback of ACK/NACK response information of 1 bit, the other 3 serving cells need feedback of ACK/NACK response information of 2 bits. In the embodiment, assuming that ACK/NACK response information of 4 downlink subframes, i.e., downlink subframes #n, #n+1, #n+2 and #n+3 have to be feedback in a single uplink subframe. That is, the downlink window consists of downlink subframes #n, #n+1, #n+2 and #n+3. In Cell#0, the UE detects that DL DAI=0 in downlink subframe #n, DL DAI=1 in downlink subframe #n+1, and DL DAI=2 in downlink subframe #n+2. In Cell#1, the UE detects that DL DAI=0 in downlink subframe #n, DL DAI=2 in downlink subframe #n+2, and DL DAI=3 in downlink subframe #n+3. In Cell#2, the UE detects that DL DAI=0 in downlink subframe #n, DL DAI=1 in downlink subframe #n+1, DL DAI=2 in downlink subframe #n+2 and DL DAI=3 in downlink subframe #n+3. In Cell#0, subframe#n+3 is the SPS transmission subframe. In the serving cells, there is no DCI format indicating the SPS release in the serving cells. Since the ACK/NACK response information to be transmitted has more than 20 bits, it is necessary to perform the spatial bundling operation.

In Cell#0, the UE detects PDSCHs which have corresponding PDCCHs in subframes #n, #n+1 and #n+3, and detects that DL DAI=3 in the last subframe #n+3.

In Cell#0, the UE detects PDSCHs which have corresponding PDCCHs in subframes #n, #n+2 and #n+3, and detects that DL DAI=3 in the last subframe #n+3.

In Cell#2, the UE detects PDSCHs which have corresponding PDCCHs in all the downlink subframes.

In Cell#3, the UE detects PDSCHs which have corresponding PDCCHs in none of the downlink subframes.

In the embodiment, one of the following approaches is used to determine the power control parameter $n_{HARQ}$ for the PUCCH format 3 transmission.

I: the UE determines the power control parameter $n_{HARQ}$ for the PUCCH format 3 transmission according to equation (4).

Specifically, if the UE detects three PDSCHs which have corresponding PDCCHs in received Cell#0, $N_{0,PDSCH}^{received}=3$; if the UE detects three PDSCHs which have corresponding PDCCHs in Cell#1, $N_{1,PDSCH}^{received}=3$; if the UE detects four PDSCHs which have corresponding PDCCHs in Cell#2, $N_{2,PDSCH}^{received}=4$; if the UE does not detect a PDSCH which has a corresponding PDCCH in Cell#3, $N_{3,PDSCH}^{received}=0$; if downlink subframe #n+3 in DL Cell#0 is an SPS transmission subframe, $N_{SPS}=1$; and $n_{HARQ}$ is resulted according to equation (4);

II: if the UE determines the power control parameter $n_{HARQ}$ for the PUCCH format 3 transmission according to equation (6), $n_{HARQ}=10$.

In the embodiment, the transmission of ACK/NACK response information in PUCCH format 3 is implemented in the following way.

The UE obtains an ACK/NACK response information sequence corresponding to the ACK/NACK response information in an order of Cell#0, Cell#1, Cell#2 and Cell#3, for a same serving cell, maps the ACK/NACK response information to the ACK/NACK response information sequence according to the values of DL DAI, then maps the ACK/NACK response information in the ACK/NACK response information sequence to two ACK/NACK response information sequences according to their respective even and odd positions, encodes each ACK/NACK response information bit sequence in the RM encoding scheme, and cascaded-interleaves the two encoded ACK/NACK response information bit sequences for transmission.

Specifically, the UE maps the ACK/NACK response information for a same serving cell to the ACK/NACK response information sequence according to the values of DL DAI in the following way: the UE maps the spatial-bundled ACK/NACK response information to the ACK/NACK response information sequence according to the values of DL DAI in the downlink grant information.

According to the disclosure, for the TDD system, the power control parameter $n_{HARQ}$ for the PUCCH format 3 transmission may be determined, which efficiently addresses the problem regarding power control when feedback is performed in PUCCH format 3 and thus implements transmission of response information in the PUCCHs.

What are described above are just preferred embodiments of the disclosure and are not intended to limit the scope of the disclosure.

The invention claimed is:

1. A physical uplink control channel (PUCCH) power control method, comprising:
   determining, by a user equipment (UE), a value of a power control parameter $n_{HARQ}$ for a PUCCH format 3 transmission; and
   performing, by the UE, power control on the PUCCH format 3 transmission based on the value of the $n_{HARQ}$;
   wherein the determining, by the UE, the power of the power control parameter $n_{HARQ}$ for the PUCCH format 3 transmission comprises:
   when a spatial bundling operation is employed, determining the $n_{HARQ}$ as a sum of a number of UE-received physical downlink shared channels (PDSCHs) with corresponding PDCCHs, a number of semi-persistent scheduling (SPS) subframes and a number of downlink control information (DCI) indicating SPS release;
   wherein the performing, by the UE, power control on the PUCCH format 3 based on the value of the $n_{HARQ}$ comprises:
   when the PUCCH format 3 transmission is employed in subframe i of serving cell c, putting the $n_{HARQ}$ into the following equation to result in a power $P_{PUCCH}(i)$ of subframe i transmitted in PUCCH format 3, $$P_{PUCCH}(i)=\min\{P_{CMAX,c}(i), P_{O\_PUCCH}+PL_c+h(n_{CQI}, n_{HARQ}, n_{SR})+\Delta_{F\_PUCCH}(F)+\Delta_{TxD}(F')+g(i)\}$$

wherein $P_{CMAX,c}(i)$ is a maximum transmit power of a serving cell c in subframe i, $P_{O\_PUCCH}$ is an open loop power control parameter, $\Delta_{F\_PUCCH}(F)$ is a power offset associated with PUCCH format F, $PL_c$ is a downlink path loss in the serving cell c measured and calculated by the UE, $\Delta_{TxD}(F')$ is a transmission diversity power compensation set according to a different PUCCH format F', and $h(n_{CQI}, n_{HARQ}, n_{SR})$ is a value based on the PUCCH format; when single Reed-Muller (RM) encoded PUCCH format 3 is employed and no transmission diversity is configured, $$h(n_{CQI}, n_{HARQ}, n_{SR}) = \frac{n_{HARQ} + n_{SR} - 1}{2};$$

when single RM encoded PUCCH format 3 is employed and transmission diversity is configured, or when dual RM encoded PUCCH format 3 is employed, $$h(n_{CQI}, n_{HARQ}, n_{SR}) = \frac{n_{HARQ} + n_{SR} - 1}{3},$$

wherein if a current subframe is configured as an SR transmission subframe, $n_{SR}=1$; otherwise, $n_{SR}=0$, $n_{CQI}$ is a number of bits of a channel quality indicator.

2. The power control method according to claim 1, wherein the determining, by the UE, the power control parameter $n_{HARQ}$ for the PUCCH format 3 transmission comprises:
   when a spatial bundling operation is not employed, determining the $n_{HARQ}$ as a sum of a number of UE-received transmission blocks, a number of transmission blocks for which PDCCH drop occurs, and a number of DCI indicating SPS release.

3. The power control method according to claim 1, wherein the number of UE-received PDSCHs with corresponding PDCCHs is equal to a total number of UE-received PDSCHs with corresponding PDCCHs in all configured serving cells, wherein when the UE does not detect a downlink assignment index (DL DAI) in downlink grant information in a downlink window of a serving cell, the number of UE-received PDSCHs with corresponding PDCCHs received in the serving cell is determined as 0; and when the UE detects the DL DAI in the downlink window of the serving cell, the number of UE-received PDSCHs with corresponding PDCCHs in the serving cell is determined as a number of PDSCHs corresponding to a value of a last DL DAI detected in the downlink window, and wherein the downlink window of the serving cell consists of downlink subframes of the serving cell assigned for the UE.

4. The power control method according to claim 2, wherein the number of transmission blocks for which PDCCH drop occurs is equal to a total number of transmission blocks for which PDCCH drop occurs in all serving cells configured for the UE,
   wherein when the UE does not detect a DL DAI in a downlink window of a serving cell, the number of transmission blocks for which PDCCH drop occurs in the serving cell is determined as 0; and when the UE detects the DL DAI in the downlink window of the serving cell, the number of transmission blocks for which PDCCH drop occurs in the serving cell is determined as a number of PDSCHs corresponding to a value of a last DL DAI detected by the UE in the downlink window minus a number of UE-received PDSCHs with corresponding PDCCHs in the downlink window multiplied with a number of transmission blocks corresponding to a transmission mode configured by the serving cell, and
   wherein the downlink window of the serving cell consists of downlink subframes of the serving cell assigned for the UE.

5. The power control method according to claim 1, wherein the determining, by the UE, the power control parameter $n_{HARQ}$ for the PUCCH format 3 transmission comprises:
   when a spatial bundling operation is employed, determining the $n_{HARQ}$ as a sum of a number of UE-received PDSCH with corresponding PDCCHs and a number of DCI indicating SPS release.

6. The power control method according to claim 1, wherein the determining, by the UE, the power control parameter $n_{HARQ}$ for the PUCCH format 3 transmission comprises:
   when a spatial bundling operation is not employed, determining the $n_{HARQ}$ as a sum of a number of UE-received transmission blocks and a number of DCI indicating SPS release.

7. The power control method according to claim 1, further comprising:
   when a dual RM encoding scheme is used for the PUCCH format 3 transmission, mapping ACK/NACK response information to be transmitted to two ACK/NACK response information bit sequences, encoding each ACK/NACK response information bit sequence using the RM encoding scheme, and cascaded-interleaving the two encoded ACK/NACK response information bit sequences for transmission.

8. The power control method according to claim 7, wherein the mapping the ACK/NACK response information to be transmitted to two ACK/NACK response information bit sequences comprises:
   determining, by the UE, ACK/NACK response information to be feedback based on the number of configured serving cells, a transmission mode configured by each serving cell and a ratio of uplink subframes to downlink subframes;

obtaining, by the UE, an ACK/NACK response information sequence corresponding to the ACK/NACK response information in an ascending order of serving cell indexes;

for a same serving cell, mapping, by the UE, the ACK/NACK response information to the ACK/NACK response information sequence according to values of DL DAI in downlink grant information, wherein ACK/NACK response information of DCI indicating SPS release is located at the end of the ACK/NACK response information feedback for the serving cell; and mapping, by the UE, the ACK/NACK response information in the ACK/NACK response information sequence to two ACK/NACK response information sequences according to their respective even and odd positions;

wherein the value of DL DAI indicates the number of PDSCHs accumulated to the current subframes to send.

9. The power control method according to claim 8, wherein for a same serving cell, mapping the ACK/NACK response information to the ACK/NACK response information sequence according to the values of DL DAI in downlink grant information comprises:

when a spatial bundling operation is employed, mapping, by the UE, the spatial-bundled ACK/NACK response information to the ACK/NACK response information sequence according to the values of DL DAI in the downlink grant information;

when the spatial bundling operation is not employed, mapping, by the UE, ACK/NACK response information of two transmission blocks corresponding to each PDSCH to the ACK/NACK response information sequence according to the values of DL DAI in the downlink grant information, wherein ACK/NACK response information of a first transmission block is firstly mapped and then ACK/NACK response information of a second transmission block is mapped; or the ACK/NACK response information of the second transmission block is firstly mapped and then the ACK/NACK response information of the first transmission block is mapped; or when the spatial bundling operation is not employed, mapping, by the UE, ACK/NACK response information of two codeword streams corresponding to each PDSCH to the ACK/NACK response information sequence according to the values of DL DAI in the downlink grant information, wherein when the DL DAI is an odd number, ACK/NACK response information of a first codeword stream is firstly mapped and then ACK/NACK response information of a second codeword stream is mapped, and when the DL DAI is an even number, the ACK/NACK response information of the second codeword stream is firstly mapped and then the ACK/NACK response information of the first codeword stream is mapped; or, when the DL DAI is an even number, the ACK/NACK response information of the first codeword stream is firstly mapped and then the ACK/NACK response information of the second codeword stream is mapped; when the DL DAI is an odd number, the ACK/NACK response information of the second codeword stream is firstly mapped and then the ACK/NACK response information of the first codeword stream is mapped.

10. The power control method according to claim 9, wherein the first transmission block is a transmission block of which a transmission block index is 0, the second transmission block is a transmission block of which a transmission block index is 1, the first codeword stream is a codeword stream of which a codeword stream index is 0, and the second codeword stream is a codeword stream of which a codeword stream index is 1.

11. A user equipment, comprising a determination module and a power control module, wherein the determination module is configured to determine a value of a power control parameter $n_{HARQ}$ for a PUCCH format 3 transmission and to transmit the $n_{HARQ}$ to the power control module, and wherein the power control module is configured to perform power control on the PUCCH format 3 transmission based on the value of the $n_{HARQ}$;

when a spatial bundling operation is employed, the determination module determines the $n_{HARQ}$ as a sum of a number of user equipment (UE)-received physical downlink shared channels (PDSCHs) with corresponding PDCCHs, a number of semi-persistent scheduling (SPS) subframes and a number of downlink control information (DCI) indicating SPS release, or when a spatial bundling operation is not employed, the determination module determines the $n_{HARQ}$ as a sum of a number of UE-received transmission blocks, a number of transmission blocks for which PDCCH drop occurs, and a number of DCI indicating SPS release, or when a spatial bundling operation is employed, the determination module determines the $n_{HARQ}$ as a sum of a number of UE-received PDSCH with corresponding PDCCHs and a number of DCI indicating SPS release, or when a spatial bundling operation is not employed, the determination module determines the $n_{HARQ}$ as a sum of a number of UE-received transmission blocks and a number of DCI indicating SPS release;

wherein the performing, by the UE, power control on the PUCCH format 3 based on the $n_{HARQ}$ comprises:

when the PUCCH format 3 transmission is employed in subframe i of serving cell c, putting the $n_{HARQ}$ into the following equation to result in a power $P_{PUCCH}(i)$ of subframe i transmitted in PUCCH format 3, $$P_{PUCCH}(i) = \min\{P_{CMAX,c}(i), P_{O\_PUCCH} + PL_c + h(n_{CQI}, n_{HARQ}, n_{SR}) + \Delta_{F\_PUCCH}(F) + \Delta_{TxD}(F') + g(i)\}$$

wherein $P_{CMAX,c}(i)$ is a maximum transmit power of a serving cell c in subframe i, $P_{O\_PUCCH}$ is an open loop power control parameter, $\Delta_{F\_PUCCH}(F)$ is a power offset associated with PUCCH format F, $PL_c$ is a downlink path loss in the serving cell c measured and calculated by the UE, $\Delta_{TxD}(F')$ is a transmission diversity power compensation set according to a different PUCCH format F', and $h(n_{CQI}, n_{HARQ}, n_{SR})$ is a value based on the PUCCH format; when single Reed-Muller (RM) encoded PUCCH format 3 is employed and no transmission diversity is configured, $$h(n_{CQI}, n_{HARQ}, n_{SR}) = \frac{n_{HARQ} + n_{SR} - 1}{2};$$

when single RM encoded PUCCH format 3 is employed and transmission diversity is configured, or when dual RM encoded PUCCH format 3 is employed, $$h(n_{CQI}, n_{HARQ}, n_{SR}) = \frac{n_{HARQ} + n_{SR} - 1}{3},$$

wherein if a current subframe is configured as an SR transmission subframe, $n_{SR}=1$; otherwise, $n_{SR}=0$; $n_{CQI}$ is a number of bits of a channel quality indicator.

12. The user equipment according to claim 11, wherein the number of UE-received PDSCHs with corresponding PDCCHs is equal to a total number of UE-received PDSCHs with corresponding PDCCHs in all configured serving cells,
  wherein when the UE does not detect a downlink assignment index (DL DAI) in downlink grant information in a downlink window of a serving cell, the determination module determines the number of UE-received PDSCHs with corresponding PDCCHs received in the serving cell as 0; and when the UE detects the DL DAI in the downlink window of the serving cell, the determination module determines the number of UE-received PDSCHs with corresponding PDCCHs in the serving cell as a number of PDSCHs corresponding to a value of a last DL DAI detected in the downlink window, and
  wherein the downlink window of the serving cell consists of downlink subframes of the serving cell assigned for the UE.

13. The user equipment according to claim 11, wherein the number of transmission blocks for which PDCCH drop occurs is equal to a total number of transmission blocks for which PDCCH drop occurs in all serving cells configured for the UE,
  wherein when the UE does not detect a DL DAI in a downlink window of a serving cell, the number of transmission blocks for which PDCCH drop occurs in the serving cell is determined as 0; and when the UE detects the DL DAI in the downlink window of the serving cell, the determination module determines the number of transmission blocks for which PDCCH drop occurs in the serving cell as a number of PDSCHs corresponding to a value of a last DL DAI detected by the UE in the downlink window minus a number of UE-received PDSCHs with corresponding PDCCHs in the downlink window multiplied with a number of transmission blocks corresponding to a transmission mode configured by the serving cell, and
  wherein the downlink window of the serving cell consists of downlink subframes of the serving cell assigned for the UE.

* * * * *